US012364889B2

(12) United States Patent
Williams et al.

(10) Patent No.: US 12,364,889 B2
(45) Date of Patent: Jul. 22, 2025

(54) DRY PIPE MANIFOLD SYSTEMS AND METHODS

(71) Applicant: Tyco Fire Products LP, Lansdale, PA (US)

(72) Inventors: James O. Williams, Marlborough, MA (US); Joshua Motha, Tiverton, RI (US); Normand James Roy, Coventry, RI (US)

(73) Assignee: Tyco Fire Products LP, Cranston, RI (US)

( * ) Notice: Subject to any disclaimer, the term of this patent is extended or adjusted under 35 U.S.C. 154(b) by 377 days.

(21) Appl. No.: 18/006,901

(22) PCT Filed: Oct. 5, 2021

(86) PCT No.: PCT/IB2021/059143
§ 371 (c)(1),
(2) Date: Jan. 26, 2023

(87) PCT Pub. No.: WO2022/084781
PCT Pub. Date: Apr. 28, 2022

(65) Prior Publication Data

US 2023/0271044 A1 Aug. 31, 2023

Related U.S. Application Data

(60) Provisional application No. 63/093,853, filed on Oct. 20, 2020.

(51) Int. Cl.
*A62C 35/68* (2006.01)
*A62C 35/62* (2006.01)

(52) U.S. Cl.
CPC .............. *A62C 35/68* (2013.01); *A62C 35/62* (2013.01)

(58) Field of Classification Search
CPC ....... A62C 35/62; A62C 35/64; A62C 35/645; A62C 35/68; A62C 99/009
See application file for complete search history.

(56) References Cited

U.S. PATENT DOCUMENTS

2004/0195378 A1 10/2004 Reetz, III
2009/0065611 A1 3/2009 Harris et al.
(Continued)

FOREIGN PATENT DOCUMENTS

CN 1970220 A 5/2007
DE 10015030 A1 * 9/2001 ............. A62C 35/62
(Continued)

OTHER PUBLICATIONS

Korean Intellectual Property Office as International Searching Authority; International Search Report and Written Opinion; International Patent Application No. PCT/IB2021/059143; Jan. 5, 2022; 9 pages.

*Primary Examiner* — Darren W Gorman
(74) *Attorney, Agent, or Firm* — Foley & Lardner LLP

(57) ABSTRACT

Systems, apparatuses, and methods of assembly of a dry pipe manifold assembly. The dry pipe manifold assembly including a lower plate and an upper plate fixed to the lower plate creating a water passage with a series of ports. The assembly further including a dry pipe actuator, manual reset actuator sub-assembly, manual trip valve, and alarm test sub-assembly fixed to the upper plate. The assembly allowing for fluid flow between the dry pipe actuator, manual reset actuator sub-assembly, and manual trip valve through the water passage.

20 Claims, 6 Drawing Sheets

(56) References Cited

U.S. PATENT DOCUMENTS

| | | | | |
|---|---|---|---|---|
| 2011/0108290 | A1 | 5/2011 | Feenstra | |
| 2016/0008645 | A1* | 1/2016 | Deurloo | A62C 35/62 169/20 |
| 2018/0214724 | A1* | 8/2018 | Meyer | F16K 37/0041 |
| 2019/0388719 | A1* | 12/2019 | Meyer | A62C 35/62 |

FOREIGN PATENT DOCUMENTS

| | | | | |
|---|---|---|---|---|
| JP | 2011-229693 | A | 11/2011 | |
| KR | 10-1666070 | B1 | 10/2016 | |
| WO | WO-2019025495 | A1 * | 2/2019 | A62C 35/68 |

* cited by examiner

DRY PIPE MANIFOLD SYSTEMS AND METHODS

CROSS-REFERENCE TO RELATED PATENT APPLICATIONS

The present disclosure claims the benefit of and priority to U.S. Provisional Application No. 63/093,853, titled "Dry Pipe Manifold Systems and Methods," filed Oct. 20, 2020, the disclosure of which is incorporated herein by reference in its entirety.

BACKGROUND

Dry pipe manifolds in conjunction with a diaphragm valve can be used to respond to fires by providing fluids, such as water, to address the fire. For example, dry pipe manifolds can prompt a diaphragm valve to deliver fluid from a fluid supply to a sprinkler when the sprinkler opens.

SUMMARY

At least one aspect relates to a dry pipe manifold assembly for use in a dry pipe sprinkler system, comprising a lower plate and upper plate. The lower plate providing a water passage between sub-assemblies, the lower plate comprising an elongated recess, a sealing ring surrounding the recess, and a diaphragm port. The upper plate to fix subassemblies. The upper plate comprising a series of ports for connecting an upper surface of the upper plate to the water passage, and an upper diaphragm port coupled to the diaphragm port of the lower plate. The sub-assemblies fixed to the upper plate comprising a dry pipe actuator sub-assembly, a manual trip valve, a manual reset actuator sub-assembly, and an alarm test sub-assembly. The dry pipe actuator sub-assembly comprising a pressure gage, a port for a connection to an air input, a dry pipe actuator, a valve, and a port to one of the series of ports of the upper plate. The manual trip valve comprising a valve with a drain and a port to one of the series of ports of the upper plate. The manual reset actuator sub-assembly comprising a port for a drain, a port to the upper diaphragm port of the upper plate, a pressure gage, a port for a connection to a water inlet, and a port to one of the series of ports of the upper plate. The alarm test sub-assembly comprising an inlet port pressure gage, a valve, an alarm port, and an inlet port.

At least one aspect relates to a manifold plate sub-assembly for use in a dry pipe manifold assembly. The manifold plate sub-assembly comprising a lower plate and an upper plate. The lower plate defined by a front surface and a back surface. The lower plate comprising a lower diaphragm port, a sealing ring on the back surface surrounding the lower diaphragm port that is configured to seal between the lower plate and a diaphragm chamber of a diaphragm valve, an elongated recess on the front surface, a sealing ring surrounding the recess on the front surface and diaphragm mounting holes. The upper plate defined by a front surface and a back surface. The upper plate comprising an upper diaphragm port, a sealing ring on the back surface surrounding the upper diaphragm port that is configured to seal between the front surface of the diaphragm port of the lower plate and the back surface of the upper diaphragm port of the upper plate, a series of ports to allow for a fluid flow through a water passage between the upper plate and the elongated recess of the lower plate, and diaphragm mounting holes.

At least one aspect relates to a method of assembling a dry pipe manifold assembly. The method comprising providing a lower plate defining a diaphragm port, a sealing ring surrounding the diaphragm port, an elongated recess, and a sealing ring surrounding the elongated recess. The method further comprising fixing an upper plate, defining a diaphragm port, a sealing ring surrounding the diaphragm port, and a series of ports, to the lower plate. The method further comprising fixing a dry pipe actuator sub-assembly to the upper plate and sealing a port to one of the series of ports on the upper plate. The method further comprising fixing a manual trip valve to the upper plate and sealing a port to one of the series of ports on the upper plate. The method further comprising fixing a manual reset actuator sub-assembly to the upper plate, sealing a port to one of the series of ports on the upper plate, and sealing a second port to the diaphragm port of the upper plate. The method further comprising fixing an alarm test sub-assembly to the upper plate.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Following below are more detailed descriptions of various concepts related to, and implementations of dry pipe manifold systems and methods. Dry pipe manifolds systems can limit the amount of onsite construction time, and allow for pressure testing of the entire manifold prior to installation. The ability to pressure test as a manifold separate from a diaphragm valve can allow for a reduction in shipping damage, reduce a valve pallet size, and reduce shipping container complexity. Additionally, or alternatively, the manifold can be common to all sizes of diaphragm valves allowing for a reduction in inventory. The various concepts introduced above and discussed in greater detail below can be implemented in any of numerous ways, including in dry systems and in wet systems.

Figure 1:
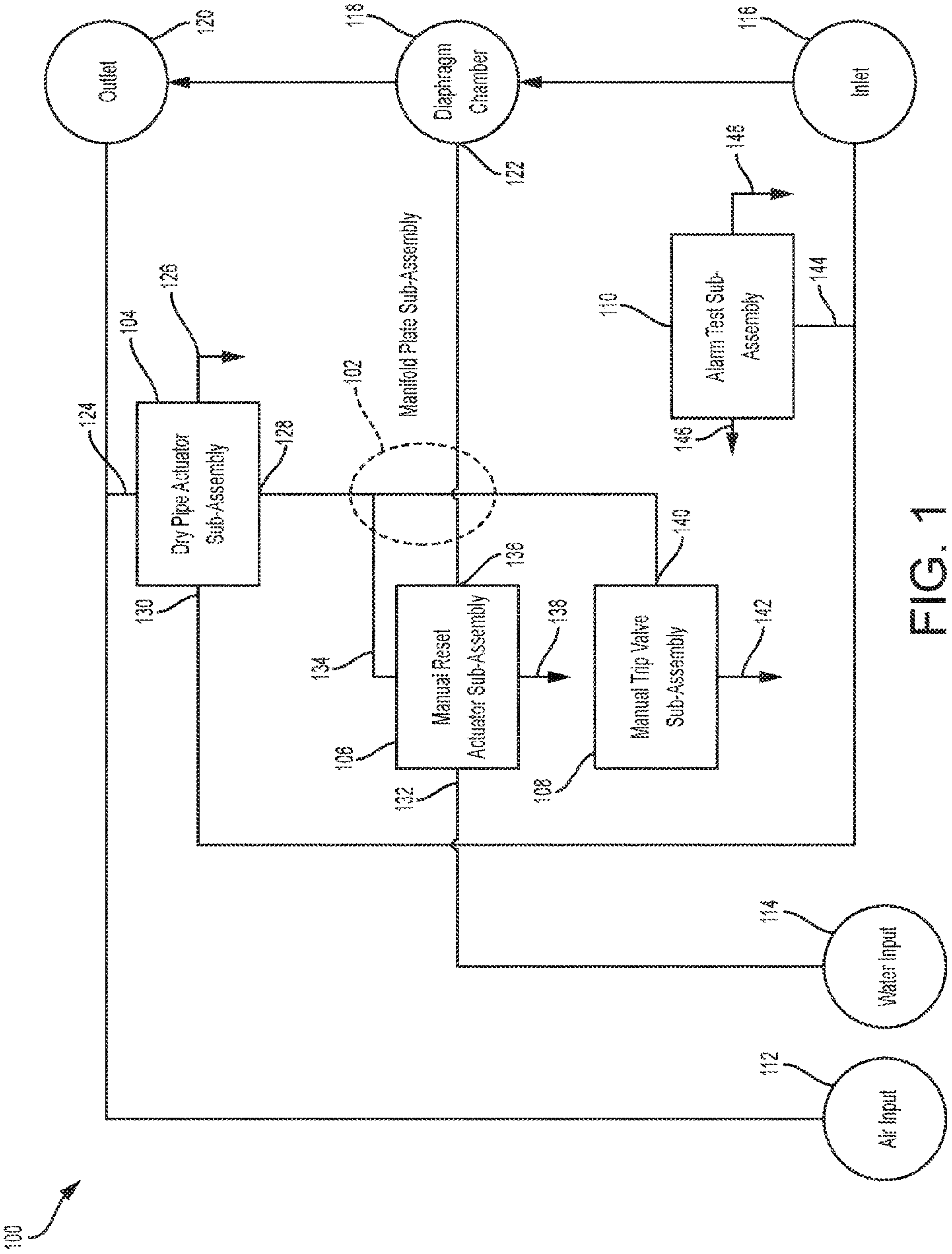
FIG. 1 is a block diagram of a dry pipe manifold assembly.

Referring to FIG. 1, among others, an example block diagram of a dry pipe manifold assembly 100 is shown. The dry pipe manifold assembly 100 can include a manifold plate sub-assembly 102, a dry pipe actuator sub-assembly 104, a manual reset actuator sub-assembly 106, manual trip valve sub-assembly 108, and an alarm test sub-assembly 110. The dry pipe manifold assembly 100 can connect to an air input 112, a water input 114, an inlet 116 of a diaphragm valve, diaphragm chamber 118, and an outlet 120 of the diaphragm valve connected to a fire suppression system (e.g., sprinkler system).

The air input 112 can supply high pressure air (e.g., 25 psi, 100 psi, 500 psi) to a thy pipe fire suppression system connected to the outlet 120. The dry pipe fire suppression system can be maintained at a high pressure that can be released when a fire is detected. The air input 112 can include a supervisory air sub-assembly. The supervisory air sub-assembly can include a pressure relief valve, a valve (e.g., ball valve, gate valve), and a check valve. The supervisory air sub-assembly can include any combination of the above listed components and additional components (e.g., regulator). The supervisory air sub-assembly can inhibit a back flow of air from the outlet 120 and fire suppression system to the air input 112. The supervisory air sub-assembly can inhibit the air input 112 from delivering air at a pressure higher than the rated pressure for the dry pipe manifold assembly 100 and the fire suppression system.

The water input 114 can supply water to the manual reset actuator sub-assembly 106. The water from the water input 114 can be of normal water pressure (e.g., 25 psi, 50 psi, 75 psi). The water from the water input 114 can be of high water pressure (e.g., 100 psi, 150 psi, 500 psi). The water input 114 can be used by the manual reset actuator sub-assembly 106 to hold a diaphragm of a diaphragm valve closed, thus inhibiting the flow of water from the inlet 116 to the outlet 120. The water input 114 can include a supervisory water sub-assembly. The supervisory water sub-assembly can include a valve (e.g., ball valve, gate valve), a check valve, a hydraulic filter, and a restrictor (e.g., orifice). The supervisory water sub-assembly can include any combination of the above listed components and additional components (e.g., pressure gage). The supervisory water sub-assembly can inhibit the flow rate of water to the manual reset actuator sub-assembly 106. The supervisory water sub-assembly can further be used to filter or inhibit particles (e.g., silt, sand, metal shavings) from entering the manual reset actuator sub-assembly 106. Additionally or alternatively, the supervisory water sub-assembly can inhibit backflow from the manual reset actuator sub-assembly 106 to the water input 114. The water input 114 can be the inlet 116. The water input 114 from the inlet 116 can be a tap from an inlet pipe to the diaphragm valve. The water input 114 from the inlet 116 can also be a port formed into the diaphragm valve. The water input from the inlet 116 can further include a supervisory water sub-assembly as described above.

The inlet 116 can be a tap from an inlet pipe to the diaphragm valve. The inlet 116 can also be a port formed into the diaphragm valve. The inlet 116 can be connected to an inlet port 144 of the alarm test sub-assembly 110. The inlet can also be connected to an inlet port 130 of the dry pipe actuator sub-assembly 104. The diaphragm chamber 118 can be used to inhibit water from passing from the inlet 116 to the outlet 120 of the diaphragm valve. The diaphragm chamber 118 can be connected to the manual reset actuator sub-assembly 106 by a diaphragm port 122. The diaphragm port 122 can connect to the manual reset actuator sub-assembly 106 through the manifold plate sub-assembly 102 as described below. Additionally or alternatively, the diaphragm port 122 can connect directly to a diaphragm port 136 of the manual reset actuator sub-assembly 106. The outlet 120 can be a tap from an outlet pipe from the diaphragm valve. The outlet 120 can also be a port formed into the diaphragm valve. The outlet can connect to the air input 112, the dry pipe actuator sub-assembly 104 and further connect to the fire suppression system. The outlet may normally hold air at a high pressure (e.g., 25 psi, 100 psi, 500 psi). If the fire suppression system senses a fire, the outlet can drop pressure rapidly.

The manifold plate sub-assembly 102 can connect, by a series of ports 402 and a water passage 214, a manifold port 128 of the dry pipe actuator sub-assembly 104, a manifold port 134 of the manual reset actuator sub-assembly 106, and a manifold port 140 of the manual trip valve sub-assembly 108. The water in the water passage 214 may normally be held at a high pressure (e.g., 10 psi, 50 psi, 100 psi, 500 psi). Additionally or alternatively, the manifold plate sub-assembly 102 can connect a diaphragm port 136 of the manual reset actuator sub-assembly 106 to the diaphragm port 122 of the diaphragm chamber 118.

The dry pipe actuator sub-assembly 104 can include a supervisory air pressure gage, an air supply port 124, a drain port 126, a manifold port 128, an inlet port 130, and an actuator. The supervisory air pressure gage can provide a readout for the air input 112 pressure. Additionally or alternatively, the supervisory air pressure gage can provide a readout of the pressure of the outlet and the fire suppression system. The supervisory air pressure gage can be an analog gage, digital gage, smart gage (i.e., readout provided to computer), etc. The air supply port 124 can connect to the outlet 120 and the air input 112 by a threaded connection, barbed connection, etc. The air supply port 124 can connect the air supply to the supervisory air pressure gage and/or the actuator of the dry pipe actuator sub-assembly 104. The drain port 126 can connect to the actuator of the dry pipe actuator sub-assembly 104 and function to drain the water maintained within the dry pipe actuator sub-assembly 104 and the manifold plate sub-assembly 102.

The manifold port 128 can be a port that seals to the manifold plate sub-assembly 102. For example, the manifold port 128 can be a flat surface with a port that is sealed to one of the series of ports 402 of the manifold plate sub-assembly 102 by fixing the dry pipe actuator sub-assembly 104 to the manifold plate sub-assembly 102. The manifold port 128 can include a sealing ring (e.g., o-ring, washer, gasket) to seal the connection between the dry pipe actuator sub-assembly 104 and the manifold plate sub-assembly 102. The inlet port 130 can be a port that connects the dry pipe actuator sub-assembly 104 to the inlet 116 and/or the alarm test sub-assembly 110. The inlet port 130 can connect the dry pipe actuator sub-assembly 104 to the inlet 116 and/or the alarm test sub-assembly 110 by a threaded connection, barbed connection, etc. The water from the inlet 116 and/or the alarm test sub-assembly 110 can be connected through the dry pipe actuator sub-assembly 104 to the manifold port 128. The dry pipe actuator sub-assembly 104 may not have an inlet port 130 in some instances.

The actuator of the dry pipe actuator sub-assembly 104 can include a diaphragm and a spring to normally inhibit the flow from the manifold port 128 to the drain port 126. The actuator of the dry pipe actuator sub-assembly 104 can include a pressure sensor and an automatically actionable valve that can open when a drop in pressure from the air supply port 124 is sensed. These are particular configurations and there are a number of other configurations that would allow the actuator to function as described below.

The actuator of the dry pipe actuator sub-assembly 104 can function to normally inhibit the flow of water from the water passage 214 of the manifold plate sub-assembly 102 to the drain port 126. The actuator may further allow the water to flow from the manifold port 128 to the drain port 126, when the air pressure from the air supply port 124 decreases below a certain threshold (e.g., 10 psi, 30 psi, 50 psi). For example, the air input 112 pressure may normally be set to 50 psi and the water input 114 pressure may normally be set to 100 psi, thus creating a pressure in the water passage 214 of equal to or approximately, equal to 100 psi (e.g., ±2%, ±5%, ±10%). In this instance, the fire suppression system can release the air from the air input 112 when a fire is detected, thus reducing the air pressure at the air supply port 124. In this instance, the actuator of the dry pipe actuator sub-assembly 104 can drain the water in the water passage 214 causing the water pressure to decrease. The decreased water pressure from the water passage 214 can then be sensed by the manual reset actuator sub-assembly 106.

The manual reset actuator sub-assembly 106 can include a water input port 132, manifold port 134, a diaphragm port 136, a drain port 138, a water input gage, and a manual reset actuator. The water pressure, when functioning normally (i.e., diaphragm valve closed and fire suppression system set to normal functioning pressure) of the water input port 132, manifold port 134, diaphragm port, and the water input gage are held at equal, or substantially equal pressures (e.g., e.g., ±2%, ±5%, ±10%). The water input port 132 can connect to the water input 114 by a threaded connection, barbed connection, etc. The water input port 132 can function to maintain a set water pressure in the water passage 214 of the manifold plate sub-assembly 102 and the diaphragm chamber 118. The water input port 132 can normally connect to the manifold port 134, the diaphragm port 136, and the inlet water gage through the manual reset actuator. The water input port 132 can include a restriction (e.g., ⅛" passage). The restriction can function to limit the flow of the water from the water input 114 through the manual reset actuator.

The manifold port 134 can be a port that seals to the manifold plate sub-assembly 102. For example, the manifold port 134 can be a flat surface with a port that is sealed to one of the series of ports 402 of the manifold plate sub-assembly 102 by fixing the manual reset actuator sub-assembly 106 to the manifold plate sub-assembly 102. The manifold port 134 can include a sealing ring (e.g., o-ring, washer, gasket) to seal the connection between the manual reset actuator sub-assembly and the manifold plate sub-assembly 102.

The diaphragm port 136 can be a port that seals to the manifold plate sub-assembly 102. For example, the diaphragm port 136 can be a flat surface with a port that is sealed to an upper diaphragm port 404 of the manifold plate sub-assembly 102 by fixing the manual reset actuator sub-assembly 106 to the manifold plate sub-assembly 102. The diaphragm port 136 can include a sealing ring (e.g., o-ring, washer, gasket) to seal the connection between the manual reset actuator sub-assembly 106 and the manifold plate sub-assembly 102. The drain port 138 can connect to the manual reset actuator and function to drain the water from the diaphragm chamber 118. The drain can further function to drain the water from the water passage 214.

The manual reset actuator can include a plunger and a spring to normally allow water to flow from the water input port 132 to the water input gage, the manifold port 134, and the diaphragm port 136. The manual reset actuator can also function to normally inhibit the water from draining from the drain port 138. The manual reset actuator can include a diaphragm and a spring to normally inhibit the flow to the drain port 138. The manual reset actuator can include a pressure sensor and an automatically actionable valve that can open when a drop in pressure from the manifold port 134 is sensed. These are particular configurations and there are a number of other configurations that would allow the actuator to function as described below. For example, the manual reset actuator may function to normally allow flow from the water input 114 to the manifold port 134 and the water passage 214. The manual reset actuator can normally allow water from the water input 114 to flow to the diaphragm chamber. When the water is drained from the water passage 214 by the dry pipe actuator sub-assembly 104 or the manual trip valve sub-assembly 108, the manual reset actuator can trip allowing water to drain from the diaphragm chamber 118, through the drain port 138, thus opening the diaphragm valve. The manual reset actuator can include a manual reset that allows a user to reset the manual reset actuator once tripped as described above. The manual reset can be a single plunger that is pushed or pulled by the user to reset the manual reset actuator. This is an example configuration for a manual reset and many other configurations are possible. For example, the manual reset can be a knob attached to a gear set that allows the manual reset actuator to be reset.

The manual trip valve sub-assembly 108 can include a manifold port 140, a drain port 142, a manual valve, and a solenoid valve. The manifold port 140 can be a port that seals to the manifold plate sub-assembly 102. For example, the manifold port 140 can be a flat surface with a port that is sealed to one of the series of ports 402 of the manifold plate sub-assembly 102 by fixing the manual trip valve sub-assembly 108 to the manifold plate sub-assembly 102. The manifold port 134 can include a sealing ring (e.g., o-ring, washer, gasket) to seal the connection between the manual reset actuator sub-assembly and the manifold plate sub-assembly 102. The drain port 142 can connect to the manual valve and/or the solenoid valve and function to drain the water from the water passage 214.

The manual trip valve sub-assembly 108 can use a manual valve (e.g., ball valve, gate valve) and/or a solenoid valve to drain the water passage 214. For example, a user can manually turn a valve to drain the water passage 214. The drained water passage 214 can then trip the manual reset actuator sub-assembly 106 causing the diaphragm chamber 118 to drain and the diaphragm valve to open. In another example, a user may pull a fire alarm that is connected via a set of wires to the solenoid valve of the manual trip valve sub-assembly 108 thus draining the water passage 214. The drained water passage 214 can then trip the manual reset actuator sub-assembly 106 causing the diaphragm chamber 118 to drain and the diaphragm valve to open.

The alarm test sub-assembly 110 can include an inlet port 144, an alarm port 146, an alarm test port 148, an inlet port pressure gage, and a supervisory switch. The inlet port 144 can be a port that connects the alarm test sub-assembly 110 to the inlet 116. The inlet port 144 can connect the alarm test sub-assembly 110 to the inlet 116 by a threaded connection, barbed connection, etc.

The alarm port 146 can be a port on the alarm test sub-assembly 110 that is connected through the alarm test sub-assembly 110 to the inlet port 144. The alarm port 146 can be a port that connects to an alarm and/or series of alarms throughout a building that senses the inlet pressure. The alarm can send a visual and/or auditory alert when the inlet pressure drops below a predetermined level (e.g., 5 psi. 50 psi, 250 psi). The alarm test port 148 can include a normally closed valve and a drain that can be used by a user to test the alarm of the alarm port 146. The alarm can be tested by opening the valve of the alarm test port 148 to drop the pressure thus setting off the alarm.

The inlet port pressure gage can provide a readout for the inlet 116 pressure. The supervisory air pressure gage can be an analog gage, digital gage, smart gage (i.e., readout provided to computer), etc. The supervisory switch of the alarm test sub-assembly 110 can be a switch that sounds a visual/auditory alarm and/or send a signal that can indicate if a user has manipulated the valve of the alarm test port 148. For example, the supervisory, switch can inhibit alarms connected to the alarm port from sounding throughout a building while the alarm is being tested. The alarm test sub-assembly 110 can further include an automatic drain valve that can be used to relieve pressure when the pressure from the inlet 116 is too high for the dry pipe manifold assembly 100 (e.g., 2.5 psi, 100 psi, 500 psi).

Figure 2:
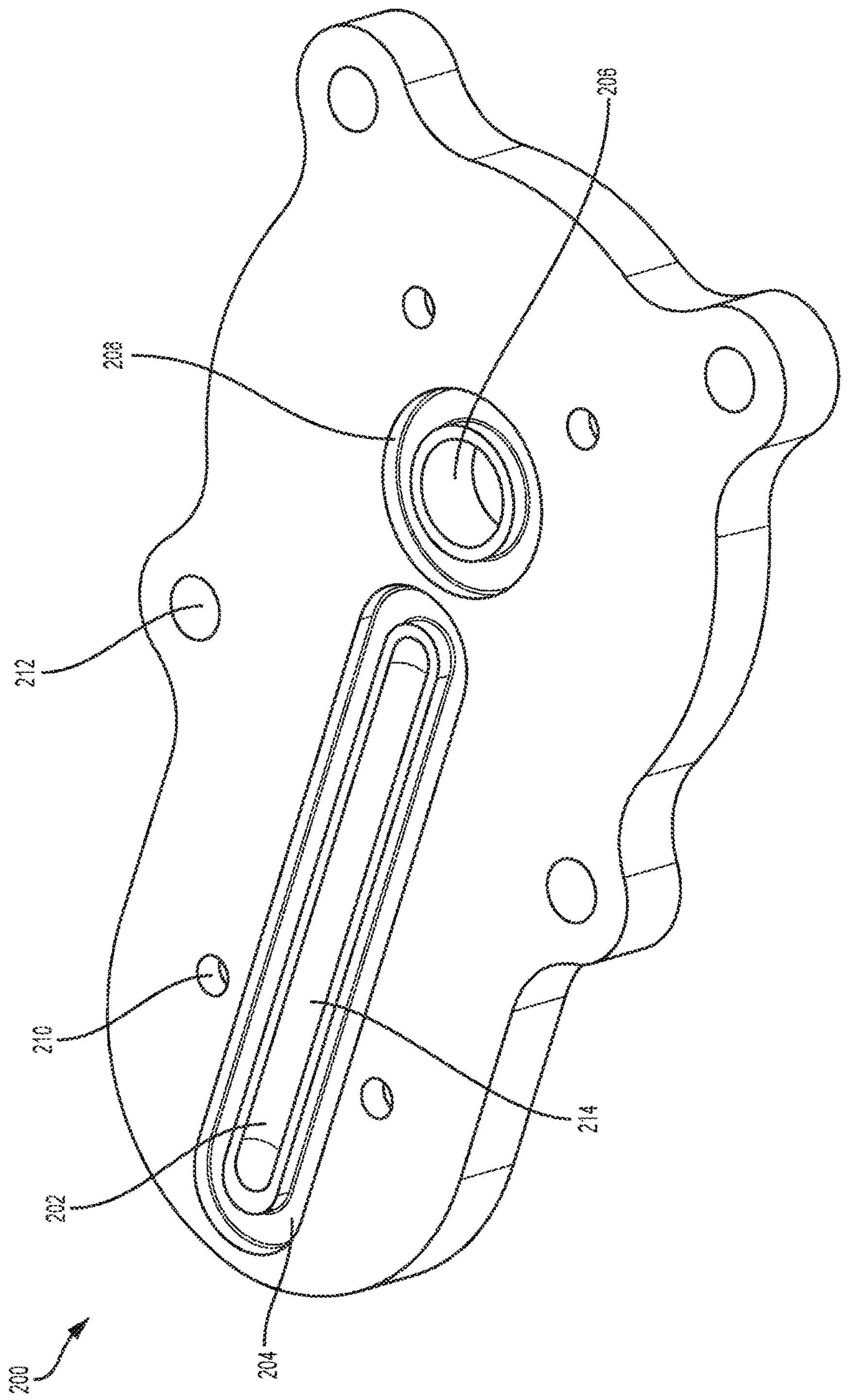
FIG. 2 is an isometric view of a front side of a lower plate of a manifold plate sub-assembly.

Referring to FIG. 2, among others, an isometric view of the front side of a lower plate 200 of a manifold plate sub-assembly 102 is shown. The lower plate 200 can include an elongated recess 202, sealing recess 204, a lower diaphragm port 206, a sealing recess 208, a series of manifold conjoining holes 210, and diaphragm valve mounting holes 212. The lower plate 200 is shown with rounded edges and a shape formed around the components shown above. The lower plate 200 can be of a rectangular shape, or any other suitable shape. For example, the lower plate 200 can be shaped to remove all excess material solely providing material and connections for the components shown above. The lower plate 200 can be made from any suitable material (e.g., aluminum). The lower plate 200 can be manufactured by any suitable method (e.g., casting, machining).

The elongated recess 202 can be an elongated rounded recess, as shown. The elongated recess 202 can be rectangular or rounded with flat sides, among many other possible configurations. The recess can function to form a water passage 214 when sealed against an upper plate 400. The elongated recess 202 can be of sufficient size to allow for the flow of water between the dry pipe actuator sub-assembly 104, manual reset actuator sub-assembly 106, and the manual trip valve sub-assembly 108 through the water passage 214. The length of the elongated recess should of sufficient size to allow all of the ports in the series of ports 402 access to the elongated recess 202 and the water passage 214 formed.

The sealing recess 204 can be a recess formed surrounding the elongated recess 202. The sealing recess 204 can function to hold a sealing ring (e.g., o-ring, washer, gasket) that assists in creating a seal between the lower plate 200 and the upper plate 400. The sealing recess 204 can be removed depending on the sealing ring used. For example, a gasket can be used to seal between the lower plate 200 and the upper plate 400 without a sealing recess 204. The sealing ring can be a ring, or any suitable shape to seal between the lower plate 200 and the upper plate 400. For example, the sealing ring can be a gasket with the shape of the lower plate 200 to create a seal across the entire front side of the lower plate 200.

The lower diaphragm port 206 can be a port allowing water to flow between the upper diaphragm port and the diaphragm chamber 118. The lower diaphragm port 206 can be of a circular shape, among other possible configurations, passing from the front side of the lower plate 200 to the back side of the lower plate 200. The sealing recess 208 can be a recess formed surrounding the lower diaphragm port 206. The sealing recess 208 can function to hold a sealing ring (e.g., o-ring, washer, gasket) that can assist in creating a seal between the lower plate 200 and the upper plate 400. The sealing recess 208 can be removed depending on the sealing ring used. For example, a gasket can be used to seal between the lower plate 200 and the upper plate 400 without a sealing recess 208. The sealing ring can be a ring, or any suitable shape to seal between the lower plate 200 and the upper plate 400. For example, the sealing ring can be a gasket with the shape of the lower plate 200 to create a seal across the entire front side of the lower plate 200.

The series of manifold conjoining holes 210 can function, with a series of fasteners, to fix the upper plate 400 to the lower plate 200. The manifold conjoining holes 210 can allow fasteners to be passed through the lower plate 200 to fix the upper plate 400 to the lower plate 200. The manifold conjoining holes 210 may have a flat interior surfaces. The manifold conjoining holes 210 can have threaded interior surfaces. For example manifold conjoining holes 406 of the upper plate 400 can have a flat interior surface and the manifold conjoining holes 210 of the lower plate 200 can have a threaded interior surface allowing a user to bolt the two plates together without using a nut. These are example configurations, and there are many other possible configurations of the conjoining holes.

The manifold conjoining holes 210 can be arranged surrounding the elongated recess 202 and the lower diaphragm port 206, as shown. The manifold conjoining holes 210 can be arranged in many other arrangements. For example, the manifold conjoining holes 210 can be arranged to be located closer to the periphery of the lower plate 200. FIG. 2 shows 4 conjoining holes, but the conjoining holes can be of any number. For example, two conjoining holes can be arranged near the end of the elongated recess 202 furthest from the lower diaphragm port 206. These are example arrangements; there are many other possible arrangements.

The diaphragm valve mounting holes 212 can function with a series of fasteners to fix the lower plate 200 to a diaphragm cover of the diaphragm valve. The diaphragm valve mounting holes 212 can allow fasteners to be passed through the lower plate 200 to fix the lower plate 200 to the diaphragm cover. The diaphragm valve mounting holes 212 can be arranged to follow a standard bolt pattern common to all sized diaphragm valves. This is beneficial, as a single lower plate 200 and subsequent dry pipe manifold assembly 100 can be used on a wide range of valves. The diaphragm valve mounting holes 212 can include 4 diaphragm valve mounting holes 212 as shown in FIG. 2. The diaphragm valve mounting holes 212 can also be arranged to use less than 4 diaphragm valve mounting holes 212.

Figure 3:
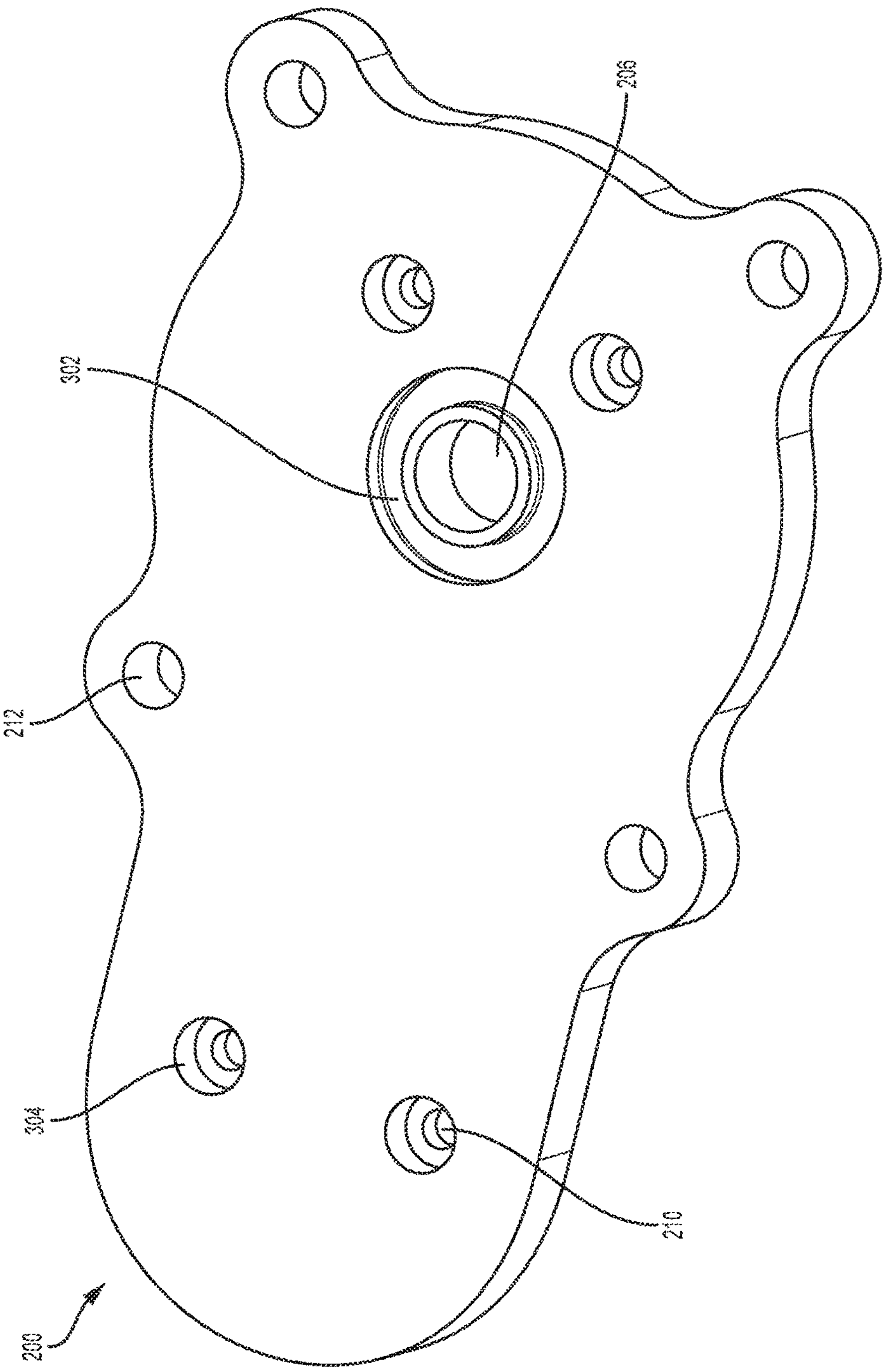
FIG. 3 is an isometric view of a back side of the lower plate of the manifold sub-assembly.

Referring to FIG. 3, among others, an isometric view of a back side of a lower plate 200 of a manifold plate sub-assembly 102 is shown. The lower plate 200 can include a lower diaphragm port 206, manifold conjoining holes 210, diaphragm valve mounting holes 212, a sealing recess 302, and manifold conjoining hole counter bores 304. The lower plate 200 is shown with rounded edges and a shape formed around the components shown above. The lower plate 200 can be of a rectangular shape, or any other suitable shape. For example, the lower plate can be shaped to remove all excess material solely providing material and connections for the components shown above. The lower plate 200 can be made from any suitable material aluminum). The lower plate 200 can be manufactured by any suitable method (e.g., casting, machining).

The lower diaphragm port 206 can be a port allowing water to flow between the upper diaphragm port 404 and the diaphragm chamber 118. The lower diaphragm port 206 can be of a circular shape, among other possible configurations, passing from the front side of the lower plate 200 to the back side of the lower plate 200. The sealing recess 302 can be a recess formed surrounding the lower diaphragm port 206. The sealing recess 208 can function to hold a sealing ring (e.g., o-ring, washer, gasket) that can assist in creating a seal between the lower plate 200 and the diaphragm cover of the diaphragm chamber 118. The sealing recess 302 can be removed depending on the sealing ring used. For example, a gasket can be used to seal between the lower plate 200 and the diaphragm cover without a sealing recess 302. The sealing ring can be a ring, or any suitable shape to seal between the lower plate 200 and the diaphragm cover. For example, the sealing ring can be a gasket with the shape of the diaphragm cover to create a seal between the back side of the lower plate 200 and the diaphragm cover.

The series of manifold conjoining holes 210 can function with a series of fasteners to fix the upper plate 400 to the lower plate 200. The manifold conjoining holes 210 can allow fasteners to be passed through the lower plate 200 to fix the upper plate 400 to the lower plate 200, The manifold conjoining holes 210 may have a flat interior surfaces. The manifold conjoining holes 406 can have threaded interior surfaces. For example manifold conjoining holes 406 of the upper plate 400 can have a flat interior surface and the manifold conjoining holes 210 of the lower plate 200 can have a threaded interior surface allowing a user to bolt the two plates together without using a nut. These are example configurations; and there are many other possible configurations of the manifold conjoining holes 210.

The manifold conjoining holes 210 can be arranged surrounding the elongated recess 202 and the lower diaphragm port 206, as shown. The manifold conjoining holes 210 can be arranged in many other arrangements. For example, the manifold conjoining holes 210 can be arranged to be located closer to the periphery of the lower plate 200. FIG. 2 shows 4 conjoining holes, but the conjoining holes can be of any number. For example, two conjoining holes can be arranged near the end of the elongated recess 202 furthest from the lower diaphragm port 206. These are example arrangements; there are many other possible arrangements. For example, the lower plate 200 may not have manifold conjoining holes 210. In this instance, the upper plate 400 can be conjoined with the lower plate 200 by using the diaphragm valve mounting holes 408 of the upper plate 400 and the diaphragm valve mounting holes 212 of the lower plate 200.

The manifold conjoining holes 210 can have manifold conjoining hole counter bores 304. The manifold conjoining hole counter bores 304 can be round as shown, among many other possible configurations. For example, the manifold conjoining hole counter bores 304 can have a hexagonal shape to inhibit the rotation of a fastener head or nut that can be inserted. The manifold conjoining hole counter bores 304 can be counter sinks. The lower plate 200 may not have manifold conjoining hole counter bores 304 for all or any of the manifold conjoining holes 210. The manifold conjoining hole counter bores 304 can function to remove or reduce the protrusion of a fastener from the back side of the lower plate 200. Alternatively or additionally, the manifold conjoining hole counter bores 304 can function to inhibit a rotation of a fastener head or nut.

The diaphragm valve mounting holes 212 can function with a series of fasteners to fix the lower plate 200 to a diaphragm cover of the diaphragm valve. The diaphragm valve mounting holes 212 can allow fasteners to be passed through the lower plate 200 to fix the lower plate 200 to the diaphragm cover. The diaphragm valve mounting holes 212 can be arranged to follow the standard bolt pattern common to all sized diaphragm valves. This is beneficial, as a single lower plate 200 and subsequent dry pipe manifold assembly 100 can be used on a wide range of valves. The diaphragm valve mounting holes 212 can include 4 diaphragm valve mounting holes 212 as shown in FIG. 2. The diaphragm valve mounting holes 212 can also be arranged to use less than 4 diaphragm valve mounting holes 212.

Figure 4:
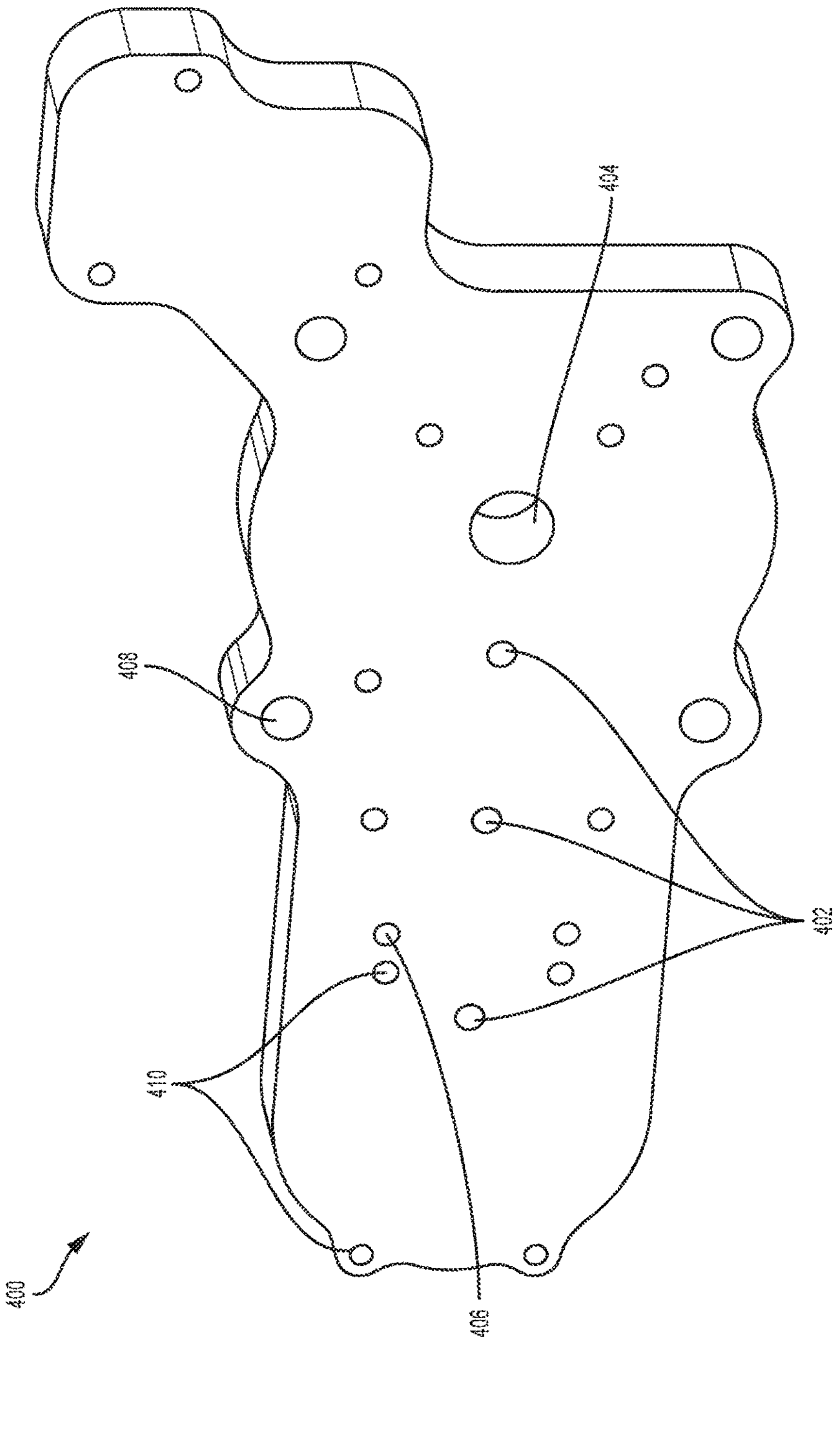
FIG. 4 is an isometric view of an upper plate of the manifold plate sub-assembly.

Referring to FIG. 4, among others, an isometric view of an upper plate 400 of a manifold plate sub-assembly 102 is shown. The upper plate 400 can include a series of ports 402, an upper diaphragm port 404, manifold conjoining holes 406, diaphragm valve mounting holes 408, and sub-assembly mounting holes 410. The upper plate 400 is shown with rounded edges and a shape formed around the components shown above. The upper plate 400 can be of a rectangular shape, or any other suitable shape. For example, the lower plate can be shaped to remove all excess material solely providing material and connections for the components shown above. The upper plate 400 can be made from any suitable material (e.g., aluminum). The upper plate 400 can be manufactured by any suitable method (e.g., casting, machining).

The series of ports 402 can pass through the upper plate 400 and provide a port to the water passage 214. The series of ports 402 can include three ports spread equidistant across the upper plate 400, this is an example configuration, and more or less than three ports can be included in the series of ports 402. The series of ports 402 can be spread across the upper plate 400 as needed to accommodate the required sub-assemblies. The series of ports 402 can function to connect the manifold port 128 of the dry pipe actuator sub-assembly 104, the manifold port 134 of the manual reset actuator sub-assembly 106, and the manifold port 140 of the manual trip valve sub-assembly 108 through the water passage 214.

The series of ports 402 can be holes cut through, or molded into the upper plate 400. The manifold ports of the sub-assemblies listed above can be connected to the series of ports by fixing the bodies of the sub-assemblies to upper plate 400. In this instance, the seal created between the series of ports 402 and the manifold ports can be a contact seal. For example, the manifold port 128 of the dry pipe actuator sub-assembly 104 can be sealed and connected to one of the series of ports 402 by fixing the dry pipe actuator sub-assembly 104 to the upper plate 400. The manifold ports as listed above can include a sealing ring (e.g., o-ring, washer, gasket) to inhibit water from being release from the seal. The series of ports 402 can include sealing recesses surrounding the ports that allow for the recessed insertion of a sealing ring. This is an example configuration, and many other configurations are available to connect the manifold ports listed above to the series of ports 402. For example, the series of ports 402 can include a threaded connection, barbed connection, etc. In these instances, the series of ports 402 can be connected to the manifold ports listed above by an intermediary connection (e.g., hose, tube).

The upper diaphragm port 404 can be a port allowing water to flow between the lower diaphragm port 206 and the diaphragm port 136 of the manual reset actuator sub-assembly 106. The upper diaphragm port 404 can be of a circular shape, among other possible configurations, passing from a front side of the upper plate 400 to a back side of the upper plate 400.

The series of manifold conjoining holes 406 can function with a series of fasteners to fix the upper plate 400 to the lower plate 200. The manifold conjoining holes 406 can allow bolts to be passed through the upper plate 400 to fix the upper plate 400 to the lower plate 200. The manifold conjoining holes 406 can have flat interior surfaces. The manifold conjoining holes 406 can have threaded interior surfaces. For example manifold conjoining holes 210 of the lower plate 200 can have a flat interior surface and the manifold conjoining holes 406 of the upper plate 400 can have a threaded interior surface allowing a user to bolt the two plates together without using a nut. These are example configurations, and there are many other possible configurations of the manifold conjoining holes 406.

The manifold conjoining holes 406 can be arranged surrounding the series of ports 402 and the upper diaphragm port 404, as shown. The manifold conjoining holes 406 can arranged in an identical arrangement to the manifold conjoining holes 210 to allow for the conjoining of the lower plate 200 to the upper plate 400. The manifold conjoining holes 406 can be arranged in many other arrangements. For example, the manifold conjoining holes 406 can be arranged to be located closer to the periphery of the upper plate 400. FIG. 4 shows 4 conjoining holes, but there can be any number of manifold conjoining holes 406. For example, two manifold conjoining holes 406 can be arranged near the end of the series of ports 402 furthest from the upper diaphragm port 404. These are example arrangements and there may be many other possible configurations. For example, the upper plate 400 may not have manifold conjoining holes 406. In this instance, the upper plate 400 can be conjoined with the lower plate 200 by using the diaphragm valve mounting holes 408 of the upper plate 400 and the diaphragm valve mounting holes 212 of the lower plate 200.

The manifold conjoining holes 406 can have manifold conjoining hole counter bores, as shown in FIG. 2. The manifold conjoining hole counter bores can be round as shown, among many other possible configurations. For example, the manifold conjoining hole counter bores can have a hexagonal shape to inhibit the rotation of a fastener head or nut that can be inserted. The manifold conjoining hole counter bores can be counter sinks. The upper plate 400 may not have manifold conjoining hole counter bores for all or any of the manifold conjoining holes 406. The manifold conjoining hole counter bores can function to remove or reduce the protrusion of a fastener from the upper plate 400. Alternatively or additionally, the manifold conjoining hole counter bores can function to inhibit a rotation of a fastener head or nut.

The diaphragm valve mounting holes 408 can function with a series of fasteners to fix the upper plate 400 and lower plate 200 to a diaphragm cover of the diaphragm valve. The diaphragm valve mounting holes 408 can allow fasteners to be passed through the upper plate 400 to fix the upper plate 400 to the diaphragm cover. The diaphragm valve mounting holes 408 can be arranged to follow the standard bolt pattern common to all sized diaphragm valves. This is beneficial, as a single upper plate 400 and subsequent thy pipe manifold assembly 100 can be used on a wide range of valves. The diaphragm valve mounting holes 408 can include 4 diaphragm valve mounting holes 408 as shown in FIG. 4. The diaphragm valve mounting holes 408 can also be arranged to use less than 4 diaphragm valve mounting holes 408. The diaphragm valve mounting holes 408 can be used in place of or in addition to the manifold conjoining holes 406 to conjoin the upper plate 400 to the lower plate 200.

The sub-assembly mounting holes 410 can function with a series of fasteners to fix the dry pipe actuator sub-assembly 104, manual reset actuator sub-assembly 106, the manual trip valve sub-assembly 108, and the alarm test sub-assembly 110 to the upper plate 400. The sub-assembly mounting holes 410 can allow fasteners to be passed through the upper plate 400 from the sub-assemblies listed above to fix the sub-assemblies to the upper plate. The sub-assembly mounting holes 410 can be arranged in such a way that the sub-assemblies listed above can all be mounted to the upper plate 400. Additionally, the sub-assembly mounting holes 410 can be arranged in such a way that allows the manifold ports of the dry pipe actuator sub-assembly 104, manual reset actuator sub-assembly 106 and the manual trip valve sub-assembly 108 to be aligned with the series of ports 402.

The sub-assembly mounting holes 410 can have counter bores on the back surface of the upper plate 400. The counter bores can be round, among many other possible configurations. For example, the counter bores can have a hexagonal shape to inhibit the rotation of a fastener head or nut that can be inserted. The counter bores can be counter sinks. The upper plate 400 may not have counter bores for all or any of the sub-assembly mounting holes 410. The counter bores can function to remove or reduce the protrusion of a fastener from the upper plate 400. Alternatively or additionally, the counter bores can function to inhibit a rotation of a fastener head or nut.

The sub-assembly mounting holes 410 can have flat interior surfaces. The sub-assembly mounting holes 410 can have threaded interior surfaces. For example, fasteners can be used to fix the sub-assemblies listed above to the upper plate 400. In this instance, the fasteners can use the threads of the sub-assembly mounting holes 410 to tighten the fasteners and more securely fix the sub-assemblies to the upper plate 400. These are example configurations, and there are many other possible configurations of the sub-assembly mounting holes 410.

Figure 5:
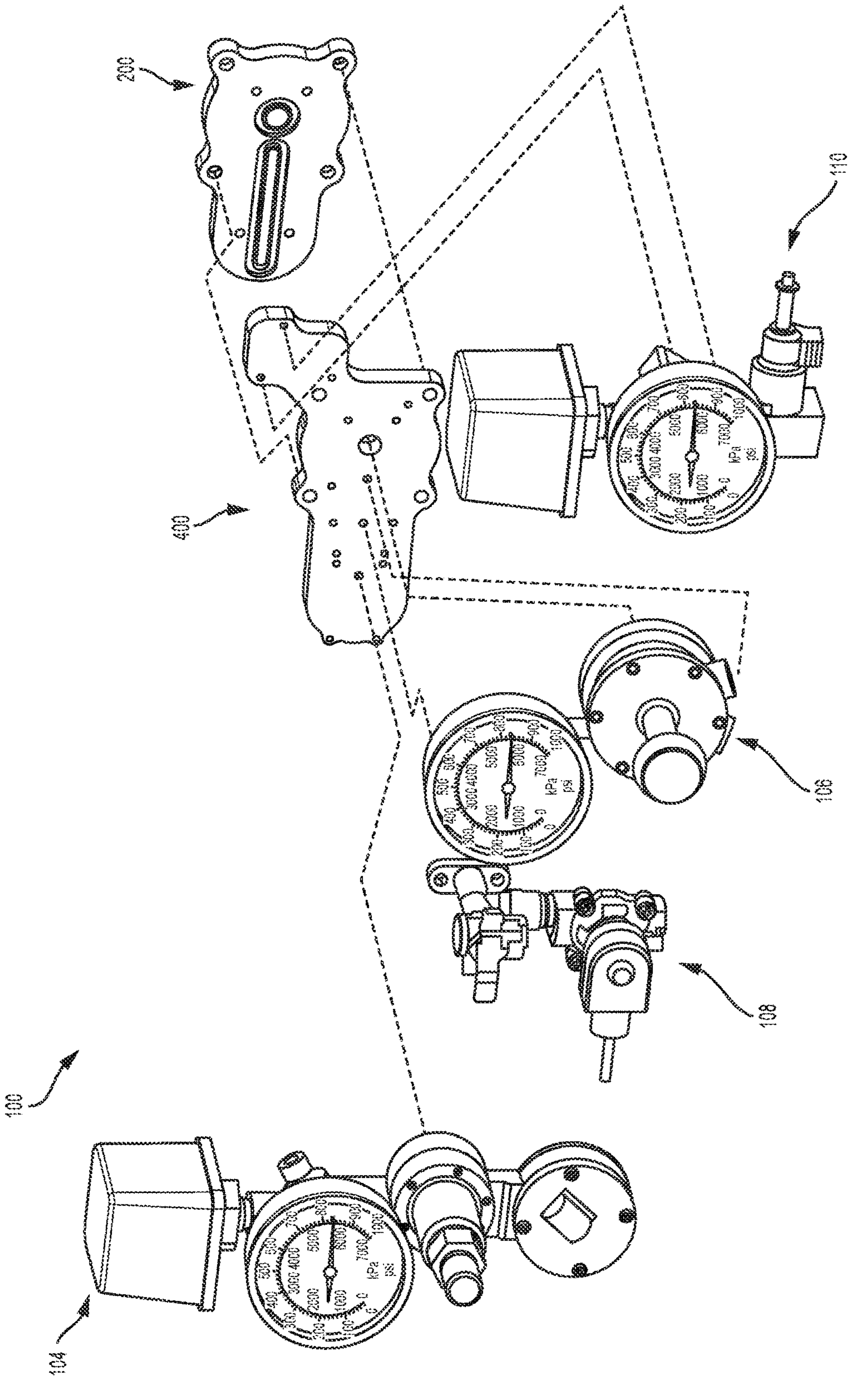
FIG. 5 is an exploded view of the dry pipe manifold assembly.

Referring to FIG. 5 and FIG. 1, among others, an exploded view of a dry pipe manifold assembly 100 is shown. The exploded view of FIG. 5 shows an example configuration of the dry pipe manifold assembly 100. As discussed above, the dry pipe manifold assembly can include a manifold plate sub-assembly 102 including a lower plate 200 and an upper plate 400, a dry pipe actuator sub-assembly 104, a manual reset actuator sub-assembly 106, manual trip valve sub-assembly 108, and an alarm test sub-assembly 110. This is an example configuration of the dry pipe manifold assembly 100, many other configurations are possible. For example, the dry pipe actuator sub-assembly 104 and the manual trip valve sub-assembly 108 can trade positions on the upper plate 400.

Figure 6:
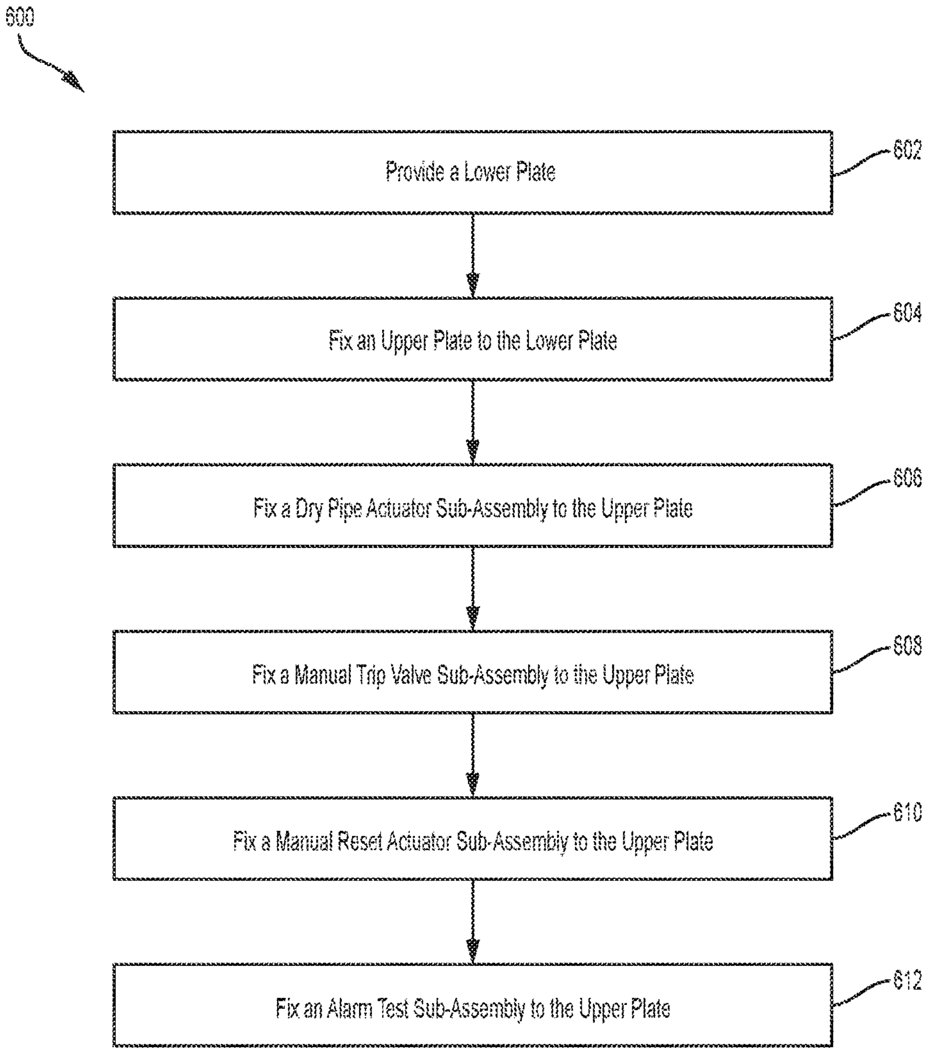
FIG. 6 is a flow chart of a method for assembling the dry pipe manifold assembly.

Referring to FIG. 6, among others, a method 600 for assembling a dry pipe manifold assembly 100. The method can start at step 602 by providing a lower plate 200. As described above, the lower plate 200 can be produced by a number of manufacturing methods (e.g., casting, machining) and can be made from a number of possible materials (e.g., aluminum).

At step 604 of the method 600, an upper plate 400 can be fixed to the lower plate 200. The upper plate 400 can be fixed to the lower plate 200 by the use of fasteners through the manifold conjoining holes 406 and 210 as described above. Additionally or alternatively, the upper plate 400 can be fixed to the lower plate 200 by the use of fasteners through the diaphragm valve mounting holes 212 and 408 as described above. Sealing rings (e.g., o-rings, washers, gaskets) can be used to surround the elongated recess 202 of the lower plate 200 and the lower diaphragm port 206 to inhibit water from leaking between the two plates. A gasket the size and shape of the lower plate 200 can be used to seal between the two plates entirely.

At step 606 of the method 600, a dry pipe actuator sub-assembly 104 can be fixed to the upper plate 400. The dry pipe actuator sub-assembly 104 can be fixed to the upper plate 400 by the use of fasteners through a body of the dry pipe actuator sub-assembly 104 and the sub-assembly mounting holes 410. The dry pipe actuator sub-assembly 104 can include a sealing ring (e.g., o-ring, washer, gasket) on the manifold port 128 to seal the manifold port 128 of the dry pipe actuator sub-assembly 104 to one of the ports of the series of ports 402.

At step 608 of the method 600, a manual trip valve sub-assembly 108 can be fixed to the upper plate 400. The manual trip valve sub-assembly 108 can be fixed to the upper plate 400 by the use of fasteners through a body of the manual trip valve sub-assembly 108 and the sub-assembly mounting holes 410. The manual trip valve sub-assembly 108 can include a sealing ring (e.g., o-ring, washer, gasket) on the manifold port 140 to seal the manifold port 140 of the manual trip valve sub-assembly 108 to one of the ports of the series of ports 402.

At step 610 of the method 600, a manual reset actuator sub-assembly 106 can be fixed to the upper plate 400. The manual reset actuator sub-assembly 106 can be fixed to the upper plate 400 by the use of fasteners through a body of the manual reset actuator sub-assembly 106 and the sub-assembly mounting holes 410. The manual reset actuator sub-assembly 106 can include a sealing ring (e.g., o-ring, washer, gasket) on the manifold port 134 to seal the manifold port 134 of the manual reset actuator sub-assembly 106 to one of the ports of the series of ports 402. The manual reset actuator sub-assembly 106 can further include a sealing ring on the diaphragm port 136 to seal the diaphragm port 136 to the upper diaphragm port 404. After step 610 of the method 600 a pressure test of the manifold plate sub-assembly 102, dry pipe actuator sub-assembly 104, manual reset actuator sub-assembly 106, and manual trip valve sub-assembly 108 can be completed. This is beneficial as the pressure test can be completed prior to shipping of the dry pipe manifold assembly 100 to a customer.

At step 612 of the method 600, an alarm test sub-assembly 110 can be fixed to the upper plate. The alarm test sub-assembly 110 can be fixed to the upper plate 400 by the use of fasteners through the body of the alarm test sub-assembly 110 and the sub-assembly mounting holes 410. The step 612 can further include connecting an inlet port 130 of the dry pipe actuator sub-assembly 104 to a port of the alarm test sub-assembly 110. The connection between the dry pipe actuator sub-assembly 104 and the alarm test sub-assembly 110 can be made by piping, tubing, etc. The connection to the ports can include threaded connections, barbed connections, etc.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A dry pipe manifold assembly for use in a dry pipe sprinkler system, comprising:

a lower plate to provide a water passage between sub-assemblies, the lower plate comprising an elongated recess, a sealing ring surrounding the elongated recess, and a lower diaphragm port; and an upper plate to fix sub-assemblies, wherein the upper plate is mechanically fixed to the lower plate to create the water passage, and the upper plate comprising a series of ports connecting an upper surface of the upper plate to the water passage, an upper diaphragm port coupled to the lower diaphragm port of the lower plate, the sub-assemblies fixed to the upper plate comprising:

a dry pipe actuator sub-assembly comprising a pressure gage, a port for a connection to an air input, a dry pipe actuator, a valve, and a port to one of the series of ports of the upper plate;

a manual trip valve comprising a valve with a drain and a port to one of the series of ports of the upper plate;

a manual reset actuator sub-assembly comprising a port for a drain, a port to the upper diaphragm port of the upper plate, a pressure gage, a port for a connection to a water input, and a port to one of the series of ports of the upper plate; and an alarm test sub-assembly comprising an inlet port pressure gage, a valve, an alarm port, and an inlet port.

2. The dry pipe manifold assembly of claim 1, comprising:

sealing rings surrounding the series of ports; and sub-assembly mounting holes corresponding with mounting holes of the sub-assemblies.

3. The dry pipe manifold assembly of claim 1, comprising:

the valve of the manual trip valve including a manual trip.

4. The dry pipe manifold assembly of claim 3, comprising:

a second valve with a solenoid trip.

5. The dry pipe manifold assembly of claim 1, comprising:

the dry pipe actuator sub-assembly is connected to the inlet port of the alarm test sub-assembly.

6. The dry pipe manifold assembly of claim 5, comprising:

a segment of piping or tubing with threaded end connections to connect the alarm test sub-assembly with the dry pipe actuator sub-assembly.

7. The dry pipe manifold assembly of claim 1, comprising:

the valve of the dry pipe actuator sub-assembly is normally closed.

8. The dry pipe manifold assembly of claim 1, comprising:

a supervisory air sub-assembly.

9. The dry pipe manifold assembly of claim 1, comprising:

a supervisory water sub-assembly.

10. A manifold plate sub-assembly for use in a dry pipe manifold assembly, comprising:

a lower plate defined by a front surface and a back surface, comprising a lower diaphragm port, a sealing ring on the back surface surrounding the lower diaphragm port that is configured to seal between the lower plate and a diaphragm chamber of a diaphragm valve, an elongated recess on the front surface, a sealing ring surrounding the elongated recess on the front surface, and diaphragm valve mounting holes; and an upper plate defined by a front surface and a back surface; comprising an upper diaphragm port, a sealing ring on the back surface surrounding the upper diaphragm port that is configured to seal between a front surface of the lower diaphragm port of the lower plate and a back surface of the upper diaphragm port of the upper plate, a series of ports to allow for a fluid flow through a water passage between the upper plate and the elongated recess of the lower plate; and diaphragm valve mounting holes.

11. The manifold plate sub-assembly of claim 10, comprising:

manifold conjoining holes through the lower plate; and manifold conjoining holes through the upper plate.

12. The manifold plate sub-assembly of claim 11, comprising:

counter bores on the back surface of the lower plate surrounding the manifold conjoining holes.

13. The manifold plate sub-assembly of claim 12, comprising:

a threaded surface on an internal surface of the manifold conjoining holes through the upper plate.

14. The manifold plate sub-assembly of claim 10, comprising:

a recess on the back surface surrounding the lower diaphragm port of the lower plate configured to maintain the sealing ring.

15. The manifold plate sub-assembly of claim 14, comprising:

a recess on the front surface surrounding the lower diaphragm port of the lower plate configured to maintain the sealing ring of the upper plate.

16. The manifold plate sub-assembly of claim 10, comprising:

sub-assembly mounting holes through the upper plate.

17. A method of assembling a dry pipe manifold assembly, comprising:

providing a lower plate defining a lower diaphragm port, a sealing ring surrounding the lower diaphragm port, an elongated recess, and a sealing ring surrounding the elongated recess;

fixing an upper plate, defining an upper diaphragm port, a sealing ring surrounding the upper diaphragm port, and a series of ports, with the lower plate;

fixing a dry pipe actuator sub-assembly with the upper plate and sealing a port with one of the series of ports on the upper plate;

fixing a manual trip valve with the upper plate and sealing a port with one of the series of ports on the upper plate;

fixing a manual reset actuator sub-assembly with the upper plate, sealing a port with one of the series of ports on the upper plate, and sealing a second port with the upper diaphragm port of the upper plate; and fixing an alarm test sub-assembly with the upper plate.

18. The method of claim 17, comprising:

connecting the dry pipe actuator sub-assembly with an inlet port of the alarm test sub-assembly.

19. The method of claim 17, comprising:

fixing the lower plate with a diaphragm valve.

20. The method of claim 17, comprising:

the dry pipe actuator sub-assembly, the manual trip valve, and the manual reset actuator sub-assembly sealed to the series of ports without an intermediate connector.

* * * * *